United States Patent
Park et al.

(10) Patent No.: US 7,862,191 B2
(45) Date of Patent: Jan. 4, 2011

(54) LAMP SOCKET, BACKLIGHT ASSEMBLY HAVING THE SAME, AND DISPLAY DEVICE HAVING THE SAME

(75) Inventors: Jin-Hee Park, Cheonan-si (KR);
Bong-Hyun You, Yongin-si (KR);
Jae-Sung Bae, Cheonan-si (KR);
Yong-Hwi Kim, Anseong-si (KR)

(73) Assignee: Samsung Electronics Co., Ltd.,
Suwon-Si (KR)

( * ) Notice: Subject to any disclaimer, the term of this patent is extended or adjusted under 35 U.S.C. 154(b) by 372 days.

(21) Appl. No.: 12/044,506

(22) Filed: Mar. 7, 2008

(65) Prior Publication Data
US 2009/0046462 A1 Feb. 19, 2009

(30) Foreign Application Priority Data
Aug. 17, 2007 (KR) .................... 10-2007-0082751

(51) Int. Cl.
*H01R 33/08* (2006.01)
*F21V 19/00* (2006.01)

(52) U.S. Cl. .................. 362/97.1; 362/225; 362/655; 362/657; 362/217.01; 439/232; 439/239

(58) Field of Classification Search ............ 362/217.01, 362/225, 217.09, 97.1, 97.2, 217.4, 217.16, 362/217.17, 647, 652, 655, 657, 658; 439/842, 439/856, 374, 699.2, 619, 857, 232, 239, 439/233, 235, 236, 217.01, 350, 352, 353, 439/355, 356, 357, 358, 375
See application file for complete search history.

(56) References Cited

U.S. PATENT DOCUMENTS

| | | | | |
|---|---|---|---|---|
| 2,248,598 | A * | 7/1941 | Yoder | 439/239 |
| 6,988,906 | B1 * | 1/2006 | Chen | 439/226 |
| 7,399,190 | B2 * | 7/2008 | Ohmori | 439/226 |
| 7,473,117 | B2 * | 1/2009 | Miyazono et al. | 439/239 |
| 7,549,881 | B2 * | 6/2009 | Cho et al. | 439/235 |
| 7,604,494 | B2 * | 10/2009 | Cho et al. | 439/232 |
| 7,699,496 | B2 * | 4/2010 | Miyazono | 362/217.01 |

* cited by examiner

*Primary Examiner*—Thomas M Sember
(74) *Attorney, Agent, or Firm*—F. Chau & Associates, LLC

(57) ABSTRACT

A lamp socket includes a socket housing and a power supply member. The socket housing has a connecting hole. The power supply member includes a first lamp and a second lamp connecting terminal. The first lamp connecting terminal is inserted into the connecting hole, and includes a securing member for preventing a lamp from secession from the lamp socket. The second lamp connecting terminal is inserted into the connecting hole, and includes securing member opening inserted by the securing member. Therefore, the number of elements may be decreased and the stability of lamp socket may be increased.

20 Claims, 13 Drawing Sheets

US 7,862,191 B2

LAMP SOCKET, BACKLIGHT ASSEMBLY HAVING THE SAME, AND DISPLAY DEVICE HAVING THE SAME

CROSS-REFERENCE TO RELATED APPLICATIONS

The present application claims priority under 35 U.S.C. §119 to Korean Patent Application No. 2007-0082751, filed on Oct. 17, 2007 in the Korean Intellectual Property Office (KIPO), the contents of which are herein incorporated by reference in their entirety.

BACKGROUND OF THE INVENTION

1. Field of the Invention

The present invention relates to a lamp socket, a backlight assembly having a lamp socket and a display device having a lamp socket. More particularly, the present invention relates to a lamp socket for an automated and stabilized assembly process, a backlight assembly having a lamp socket and a display device having a lamp socket.

2. Description of the Related Art

A backlight assembly of a liquid crystal display (LCD) device, in general, is classified as either a direct illumination type backlight assembly or an edge illumination type backlight assembly, based on the location of the light source.

A conventional backlight assembly includes a cold cathode fluorescent lamp (CCFL) as the light source. A direct illumination type backlight assembly having a CCFL includes a lamp socket to fix lamps on a bottom plate of a receiving container. In order to easily fix the lamps to the bottom plate, lamp sockets have been developed on the bottom plate to secure an electrode portion of the lamp to the lamp sockets.

A conventional lamp socket includes a socket housing, a power supply member and a socket cover. The power supply member electrically connects an inverter with a lead wire of the lamp. In an assembly process for the lamp socket, the power supply member is inserted into a hole formed in the socket housing, and the lead wire is inserted into a terminal of the power supply member. The socket cover is inserted into the socket body to fix the lead wire of the lamp to the lamp socket.

However, the number of elements of the lamp socket is large, and the socket cover is combined with the socket body after aligning the lamp. Thus, the assembly process is complicated.

Also, in a manufacturing process for assembling the backlight assembly, a wiring of an inverter is soldered to the lamp sockets, or a terminal of the lamp socket is soldered to the inverter.

When the inverter is electrically connected to the sockets through the soldering process, assembly time may be increased and the lamps may be damaged during the soldering process, thereby decreasing yield. In addition, if one of the inverters is defective, all of the lamps need to be removed to replace the defective inverter, thereby increasing repair time.

SUMMARY OF THE INVENTION

The present invention provides a lamp socket capable of decreasing the number of elements for an automated assembly process and increasing the stability of socket lamp.

The present invention also provides a backlight assembly having the above-mentioned lamp socket.

The present invention also provides a display device having the above-mentioned lamp socket.

A lamp socket in accordance with one aspect of the present invention includes a socket housing and a power supply member. The socket housing has a connecting hole. The power supply member includes a first lamp and a second lamp connecting terminal. The first lamp connecting includes a securing member for preventing a lamp from popping out of from the lamp socket. The second lamp connecting terminal includes a securing member opening.

An inverter receiving hole connected to the connecting hole may be formed through the socket housing. The power supply member may further include an inverter connecting terminal that is integrally formed with the first and second lamp connecting terminals, and is exposed through the inverter receiving hole. The power supply member may further include a connecting part connecting the inverter connecting terminal with the first and second lamp connecting terminals.

The first lamp connecting terminal may further include a first fixing portion pressing on an electrode portion of a lamp and a first guide portion that is extended from an end portion of the first fixing portion. The second lamp connecting terminal may further include a second fixing portion pressing on an electrode portion of a lamp and a second guide portion that is extended from an end portion of the second fixing portion.

A backlight assembly in accordance with another aspect of the present invention includes a receiving container, a plurality of lamps, a plurality of lamp sockets and a power supply substrate. The receiving container includes a bottom plate having a plurality of openings and a sidewall protruded from a side of the bottom plate. The lamps are disposed on the bottom plate, and each of the lamps includes a lamp body and an electrode portion on an end portion of the lamp body. The lamp sockets are received in the openings, respectively, and each of the lamp sockets includes a socket housing, and a power supply member. The socket housing has a connecting hole toward the bottom plate of the receiving container. The power supply member includes a first lamp connecting terminal and a second lamp connecting terminal. The first lamp connecting terminal includes a securing member for preventing a lamp from popping out of the lamp socket, a first fixing portion pressing on an electrode portion of a lamp and a first guide portion that is extended from an end portion of the first fixing portion. The second lamp connecting terminal includes a securing member opening that the securing member fits into, a second fixing portion pressing on the electrode portion of the lamp and a second guide portion that is extended from an end portion of the second fixing portion. The first and second connecting terminals fit through the connecting hole. The power supply substrate is disposed on a rear surface of the bottom plate to generate a lamp driving voltage to the power supply member.

An inverter receiving hole may be formed through the socket housing toward the bottom plate. The power supply member may further include an inverter connecting terminal exposed through the inverter receiving hole. The backlight assembly may further include a connecting plate on the bottom plate and a plurality of socket fixing portions to receive the lamp sockets, respectively. A side of the power supply substrate may be inserted into the inverter receiving hole, and a plurality of output terminals making contact with an inverter contact terminal may be formed on the side of the power supply substrate.

A display device in accordance with still another aspect of the present invention includes a receiving container, a plurality of lamps, a plurality of socket housings, a power supply member, a power supply substrate, a side cover, optical sheets and a display panel. The receiving container includes a bottom plate having a plurality of openings and a sidewall. The lamps are disposed on the bottom plate, and each of the lamps includes a lamp body and an electrode portion on an end portion of the lamp body. The socket housings are received in the openings, respectively, and each of the socket housings has an inverter receiving hole exposed toward the bottom plate and a connecting hole exposed toward an upper portion of the receiving container. The power supply member includes a first lamp connecting terminal, a second lamp connecting terminal, and an inverter connecting terminal. The first lamp connecting terminal is inserted into the connecting hole, and includes a securing member for preventing a lamp from popping of the lamp socket, a first fixing portion pressing on an electrode portion of a lamp and a first guide portion that is extended from an end portion of the first fixing portion. The second lamp connecting terminal is inserted into the connecting hole, and includes a securing member opening that the securing member fits into a second fixing portion pressing on the electrode portion of the lamp and a second guide portion that is extended from an end portion of the second fixing portion. The inverter connecting terminal is received in the inverter receiving hole. The power supply substrate applies a lamp driving voltage to the inverter connecting terminal, and a side of the power supply substrate is inserted into the inverter receiving hole. The side cover covers the socket housings. The optical sheets are supported by the side cover. The display panel is disposed on the optical sheets.

According to the lamp socket, the backlight assembly having the lamp socket, the display device having the lamp socket, the number of elements of the lamp socket and the number of processes for assembling the lamp socket may be decreased. Also, a wiring between the lamps and the lamp socket and a wiring between the lamp socket and the power supply substrate may be omitted. Also, a soldering process between the lamps and the lamp socket and a wiring between the lamp socket and the power supply substrate may be omitted. Also, a lamp may not accidentally pop out of or become disengaged with the lamp socket. Therefore, a manufacturing process for assembling the backlight assembly and the display device may be simplified, and the power supply substrate may be easily repaired. Also, the stability of lamp socket may be increased.

BRIEF DESCRIPTION OF THE DRAWINGS

The above and other advantages of the present invention will become more apparent by describing in detail example embodiments thereof with reference to the accompanying drawings, in which.

DESCRIPTION OF THE EMBODIMENTS

Figure 1:
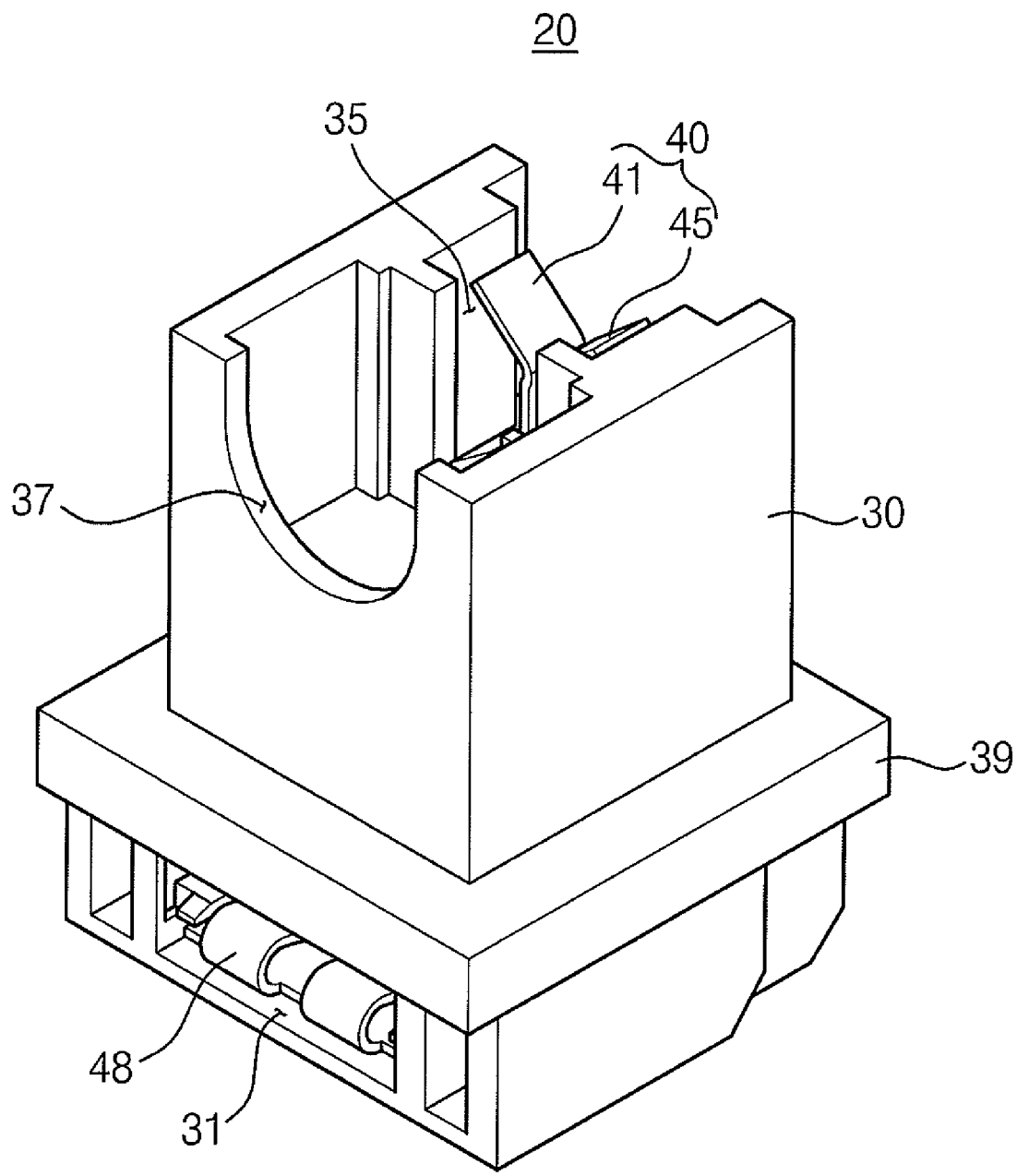
FIG. 1 is a perspective view illustrating a lamp socket in accordance with one example embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

FIG. 1 is a perspective view illustrating a lamp socket in accordance with one example embodiment of the present invention.

Referring to FIG. 1, the lamp socket 20 includes a socket housing 30 and a power supply member 40. The lamp socket 20 fixes a lamp generating light to a receiving container, and applies a lamp driving voltage to the lamp.

The socket housing 30 may be formed through an injection molding process. A connecting hole 35 may be formed on an upper portion of the socket housing 30, and an inverter receiving hole 31 connected to the connecting hole 35 may be formed on a lower portion of the socket housing 30. For example, the inverter receiving hole 31 may be opened toward the lower portion of the socket housing 30, and the connecting hole 35 is opened toward the upper portion of the socket housing 30. In addition, the inverter receiving hole 31 and the connecting hole 35 may be opened toward opposite sides of the socket housing 30. A catching protrusion 39 protrudes along side surfaces of the socket housing 30 to be combined with an external element. A lamp guide groove 37 having a round shape is formed on the upper portion of the socket housing 30. The lamp guide groove 37 is adjacent to the connecting hole 35.

Figure 2:
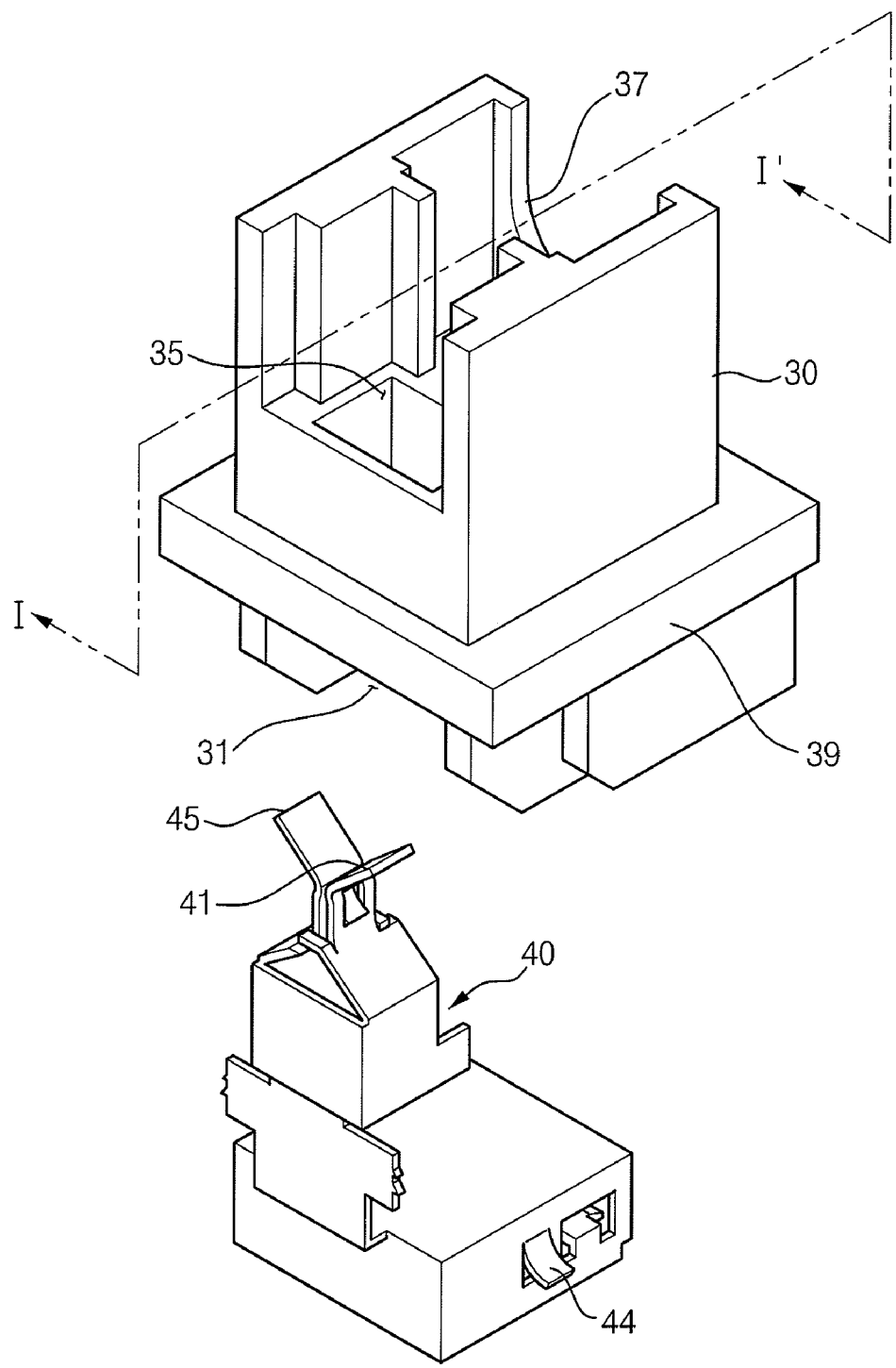
FIG. 2 is an exploded perspective view illustrating the lamp socket shown in FIG. 1.

FIG. 2 is an exploded perspective view illustrating the lamp socket shown in FIG. 1. The power supply member 40 is inserted into the socket housing 30 from the inverter receiving hole 31, and is exposed through the connecting hole 35. The power supply member 40 includes a metal so that an inverter may be electrically connected to an electrode portion of the lamp. The power supply member 40 includes a first lamp connecting terminal 45 and a second lamp connecting terminal 45. The first lamp connecting terminal 45 includes a securing member 50. The second lamp connecting terminal 41 includes securing member opening 60 inserted by the securing member 50 for preventing a lamp from popping out of from the lamp socket. The power supply member 40 may further include an inverter connecting terminal 48 that is integrally formed with the first and second lamp connecting terminals 41 and 45. The inverter connecting terminal 48 is exposed through the inverter receiving hole 31, and the first and second lamp connecting terminals 45 and 41 are exposed through the connecting hole 35.

Figure 3A:
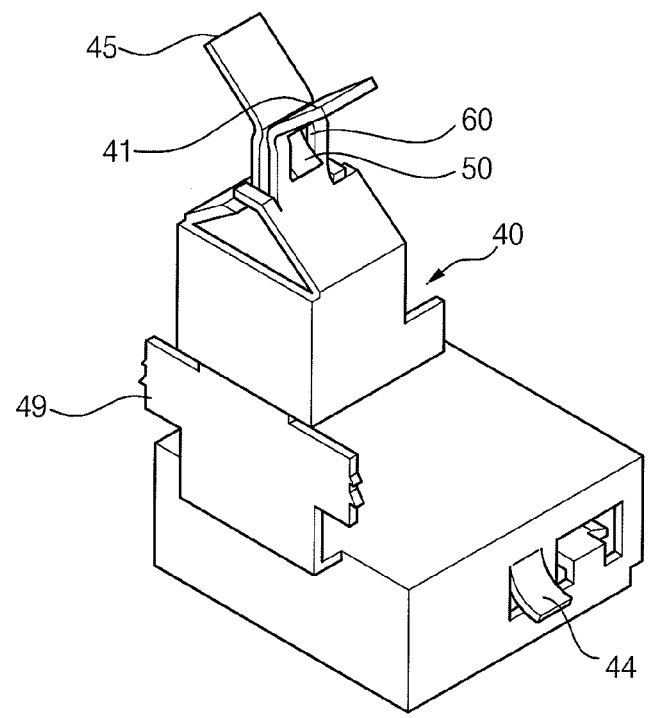
FIG. 3a to 3b are perspective view illustrating a power supply member shown in FIG. 2.

FIG. 3a is perspective view illustrating a power supply member having a bar type securing member The power supply member 40 illustrated in FIG. 3a includes a connecting part 49 that is integrally formed with the inverter connecting terminal 48 and the first and second lamp connecting terminals 41 and 45. The connecting part 49 having a plate shape electrically connects the inverter connecting terminal 48 with the first and second lamp connecting terminals 41 and 45.

The first lamp connecting terminal 45 includes a securing member 50. The second lamp connecting terminal 41 includes a securing member opening 60 which receives the securing member 50 and prevents a lamp from accidentally popping out of or being disengaged from the lamp socket.

Figure 3B:
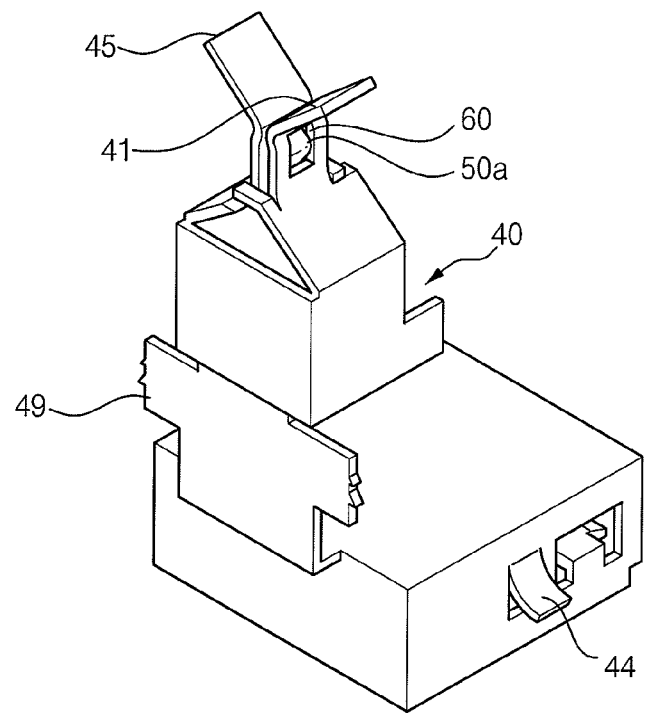
Figure 3C:
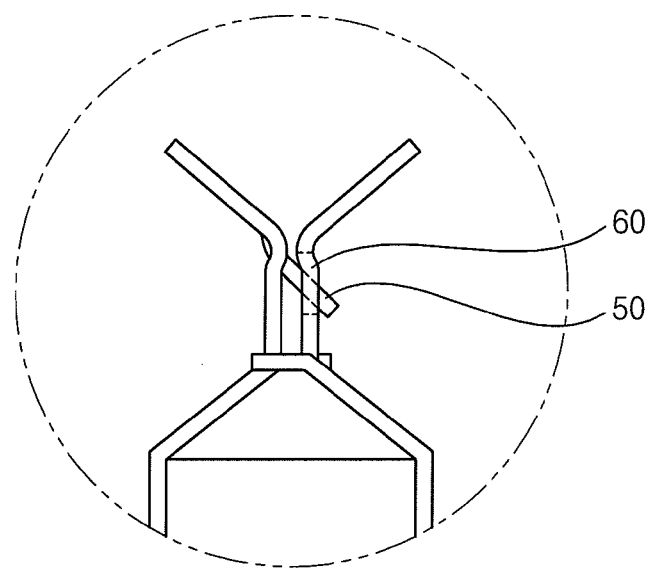
FIG. 3c to 3d are front view illustrating a power supply member shown in FIG. 2.
Figure 3D:
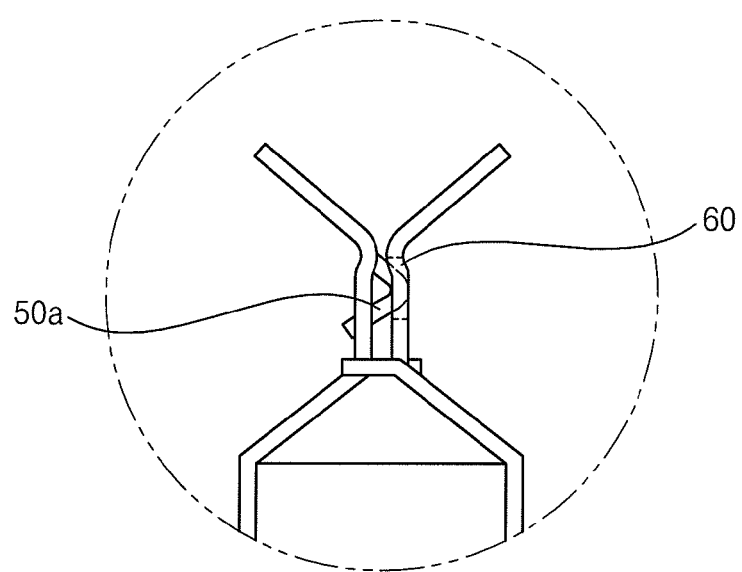

The securing member 50 or means may have a plurality of shapes that are possible to insert to the securing member opening 60. For example, the securing member 50 can be a bar type as illustrated in FIGS. 3a and 3c or a bend type as illustrated in FIGS. 3b and 3d. The lamp includes a securing member 50 that prevents a lamp from accidentally poping out of or being disengaged from the lamp socket because the securing member 50 secures the lamp to the lamp socket.

The first lamp connecting terminal 45 includes a first fixing portion 42 and a first guide portion 43. The first fixing portion 42 protrudes from the left side toward an upper portion of the lamp socket 20. The first guide portion 43 extends from an upper end portion of the first fixing portion 42, and is bent toward an inner space of the connecting hole 35. The second lamp connecting terminal 41 includes a second fixing portion 46 and a second guide portion 47. The second fixing portion 46 is opposite the first fixing portion 42, and protrudes from the right side toward the upper portion of the lamp socket 20. The second guide portion 47 opposite the first guide portion 43 extends from the upper end portion of the second fixing portion 46, and is bent toward the inner space of the connecting hole 35.

FIG. 3c is front view illustrating a power supply member shown in FIG. 3a. The securing member 50 is in the shape of a bar and extends through securing member opening 60. In some embodiments of the invention securing member 50 only extends into securing member opening 60.

FIG. 3d is front view illustrating a power supply member shown in FIG. 3b. The securing member 50a is bent so that it extends into securing member opening 60. In some embodiments of the invention securing member 50a may extend through securing member opening 60.

Figure 4:
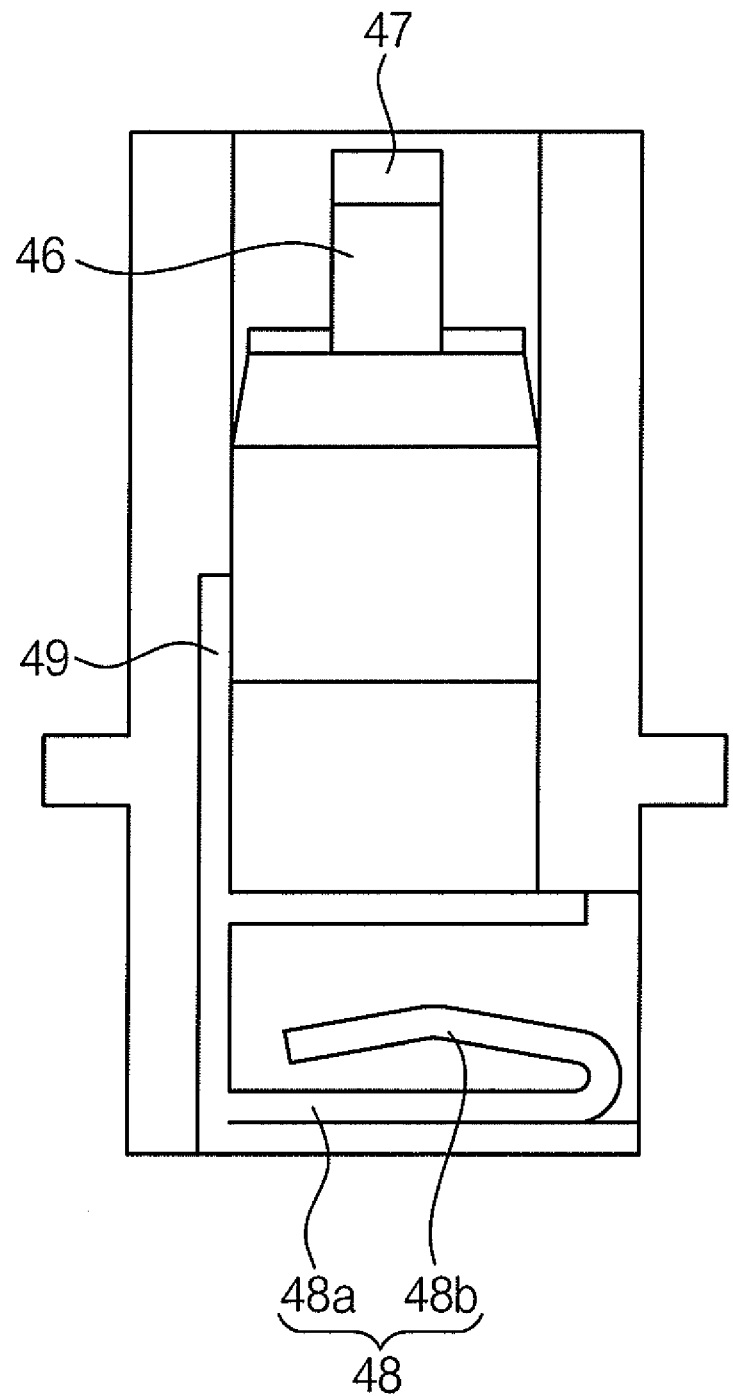
FIG. 4 is a cross-sectional view taken along a line I-I' shown in FIG. 2.

FIG. 4 is a cross-sectional view taken along a line I-I' shown in FIG. 2.

In FIG. 4, the inverter connecting terminal 48 includes a supporting portion 48a and an electric power receiving portion 48b. In FIG. 4, the supporting portion 48a is extended from the connecting portion 49 along a bottom surface toward a lower portion of a inner side surface of the inverter receiving hole 31. The electric power receiving portion 48b is bent from an end portion of the supporting portion 48a to be overlapped with the supporting portion 48a. The electric power receiving portion 48b has a convex shape protruded from the inner side surface of the inverter receiving hole 31. Therefore, the electric power receiving portion 48b is elastically deformed based on an externally provided pressure so that the electric power receiving portion 48b is securely connected to the output terminal.

The inverter connecting terminal 48 makes contact with an output terminal of a power supply substrate that is received in the inverter receiving hole 31, and is electrically connected to the output terminal of the power supply substrate. The inverter connecting terminal 48 may have various shapes. For example, the inverter connecting terminal 48 may have a spring shape, such as a leaf spring shape, so that the inverter connecting terminal 48 makes secure contact with the output terminal.

Figure 5:
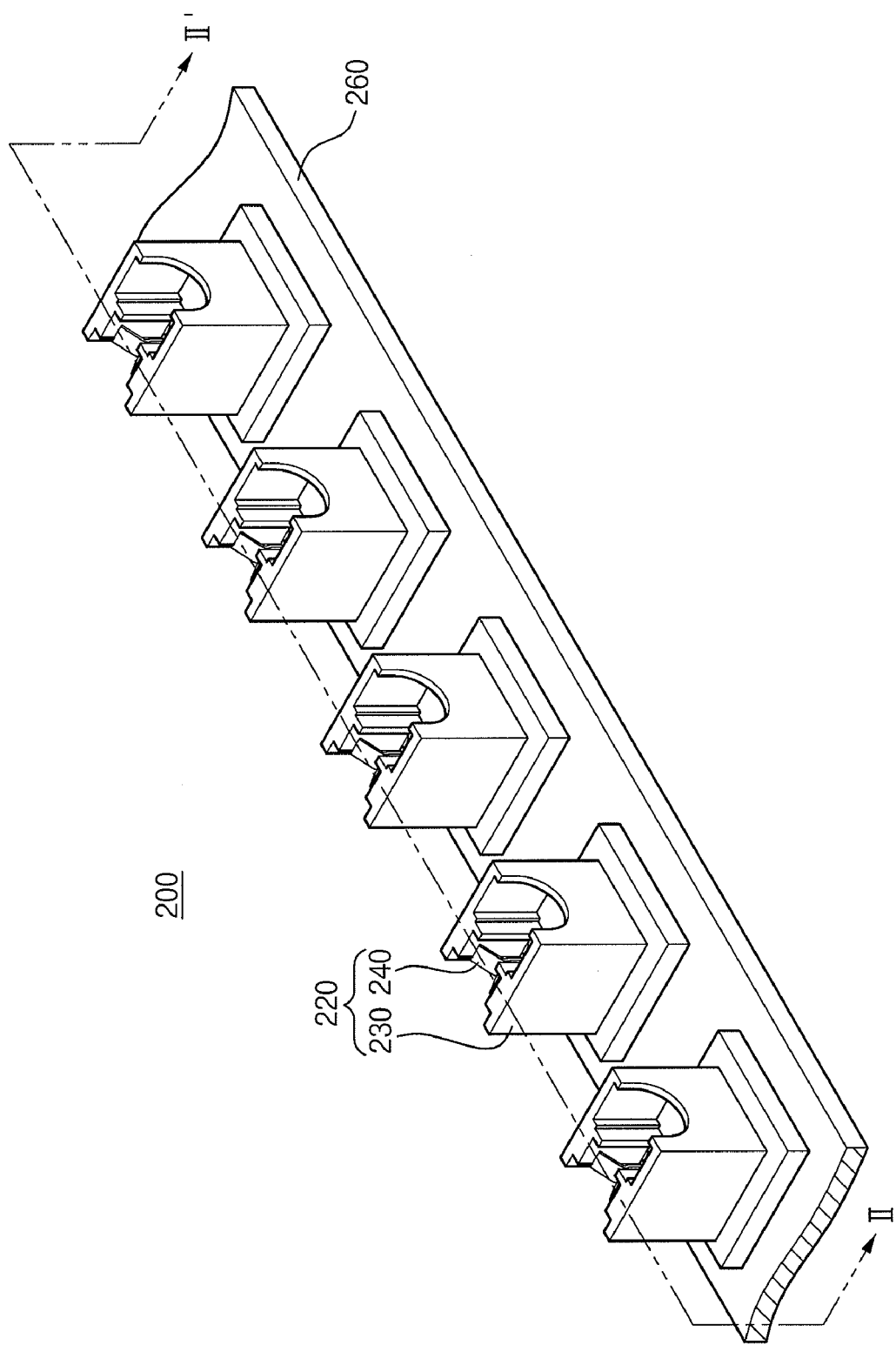
FIG. 5 is a perspective view illustrating a power supply module in accordance with one embodiment of the present invention.
Figure 6:
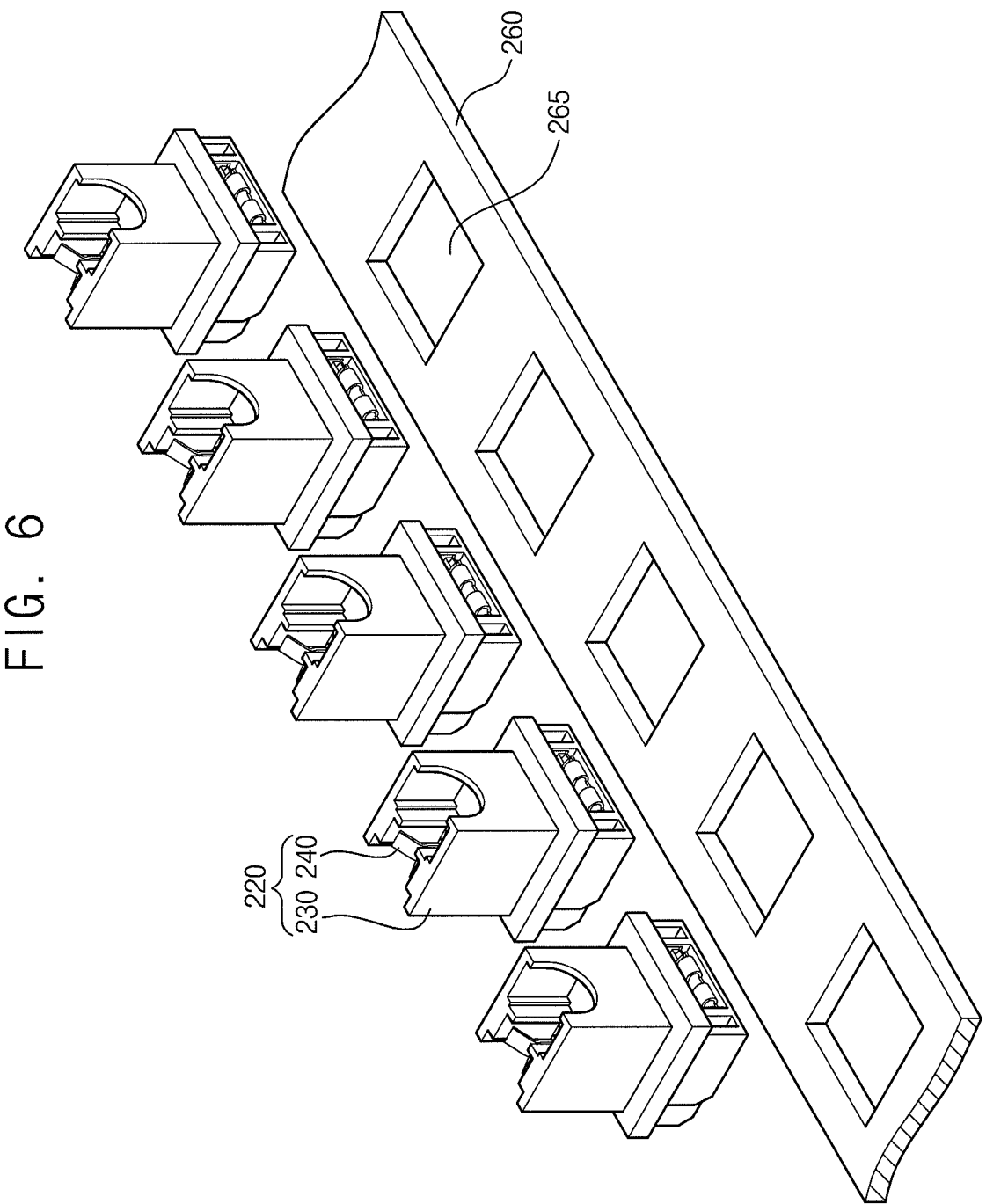
FIG. 6 is an exploded perspective view illustrating the power supply module shown in FIG. 5.
Figure 7:
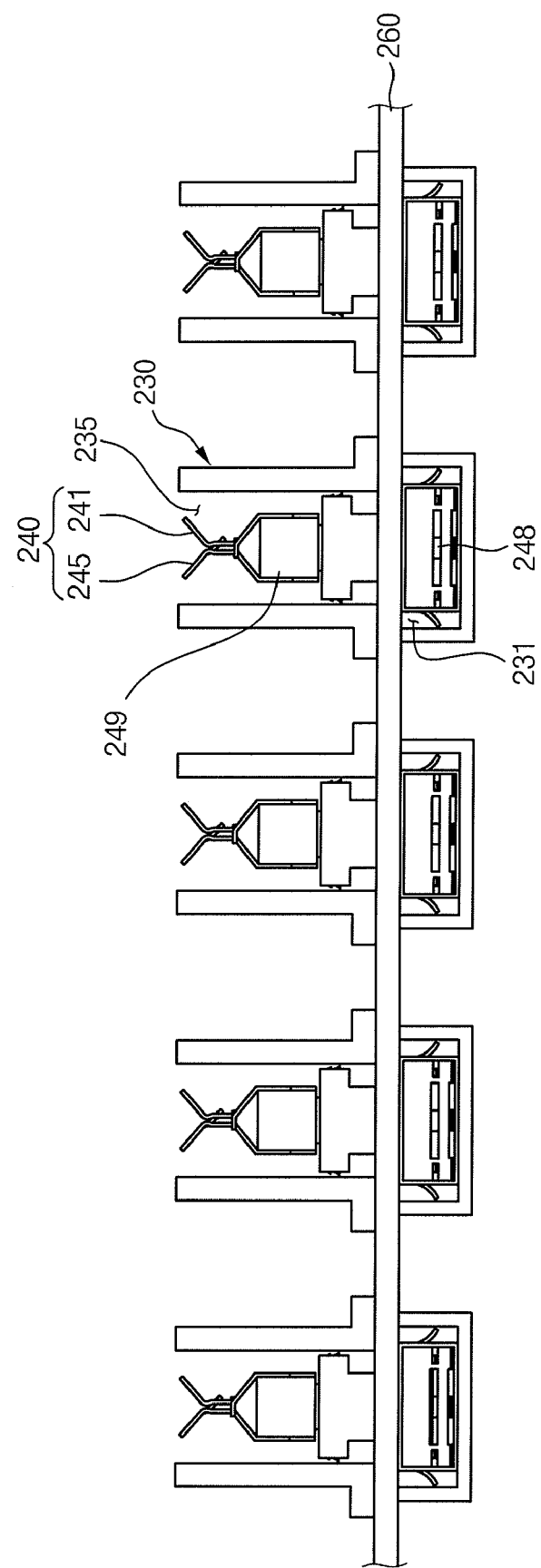
FIG. 7 is a cross-sectional view taken along a line II-II' shown in FIG. 5.

FIG. 5 is a perspective view illustrating a power supply module in accordance with one embodiment of the present invention. FIG. 6 is an exploded perspective view illustrating the power supply module shown in FIG. 5. FIG. 7 is a cross-sectional view taken along a line II-II' shown in FIG. 5.

Referring to FIG. 5, the power supply module 200 includes a connecting plate 260, a plurality of socket housings 230 and a plurality of power supply members 240 to be combined with a plurality of lamps.

Referring to FIG. 6, connecting plate 260 has a plate shape extended in a predetermined direction. A plurality of socket fixing portions 265 are formed at the connecting plate 260, each of the socket fixing portions 265 being formed at a constant distance from one another. Alternatively, the socket fixing portions 265 may be grooves extended between longitudinal sides of the connecting plate 260.

The socket housing 230 of FIGS. 5 to 7 is substantially the same as in FIGS. 1, 2 and 4.

The power supply member 240 of FIGS. 5 to 7 is substantially the same as in FIGS. 1 to 4. Thus, any further explanation concerning the above elements will be omitted.

Referring to FIG. 7, each of the socket housings 230 combined with the power supplying part 240 is inserted into each of the openings 265. The inverter receiving hole 231 formed at the socket housing 230 is exposed toward a lower surface of the connecting plate 260. The connecting hole 235 formed at the socket housing 230 is exposed toward an upper surface of the connecting plate 260.

Figure 8:
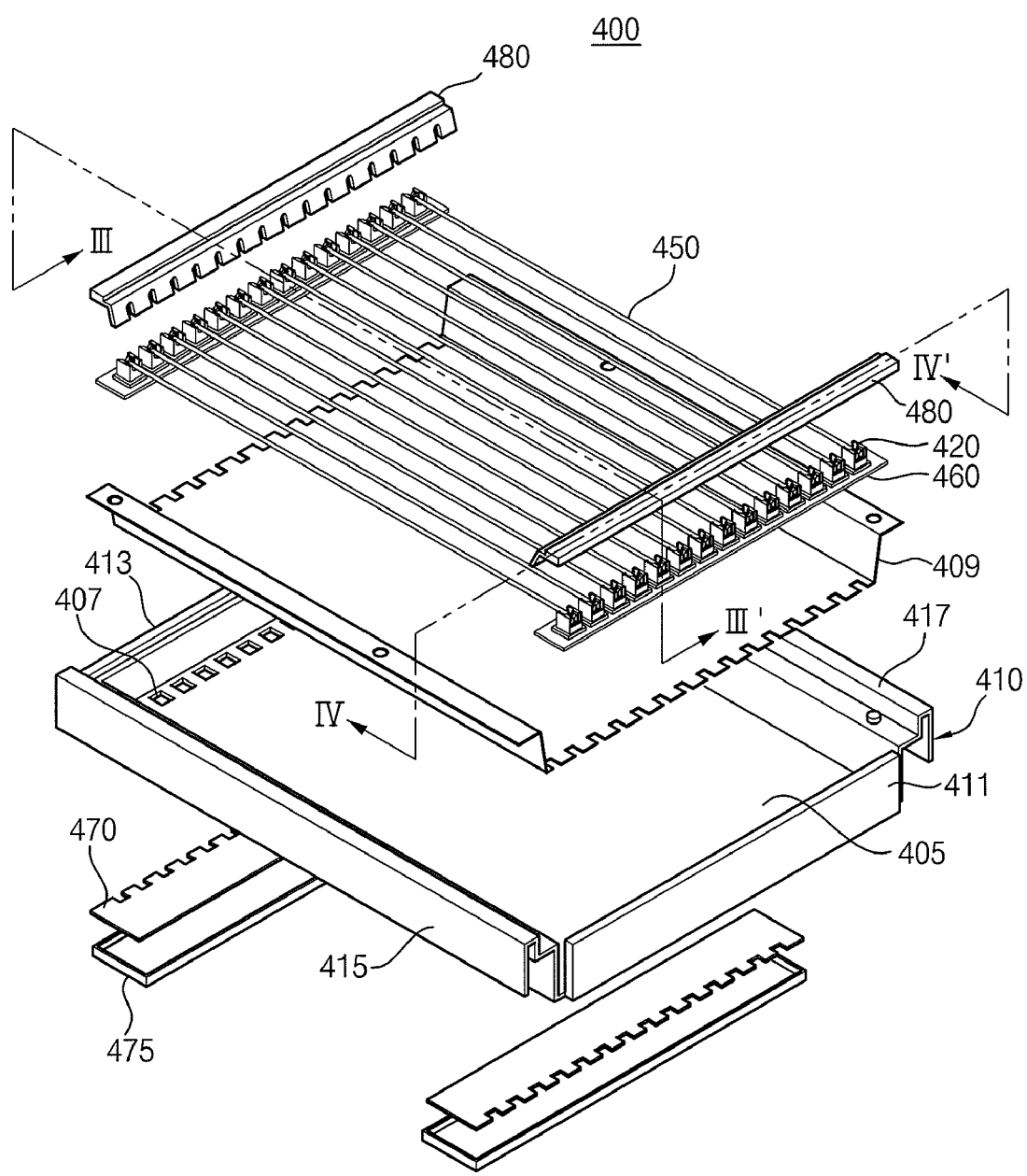
FIG. 8 is an exploded perspective view illustrating a backlight assembly in accordance with one embodiment of the present invention.
Figure 9:
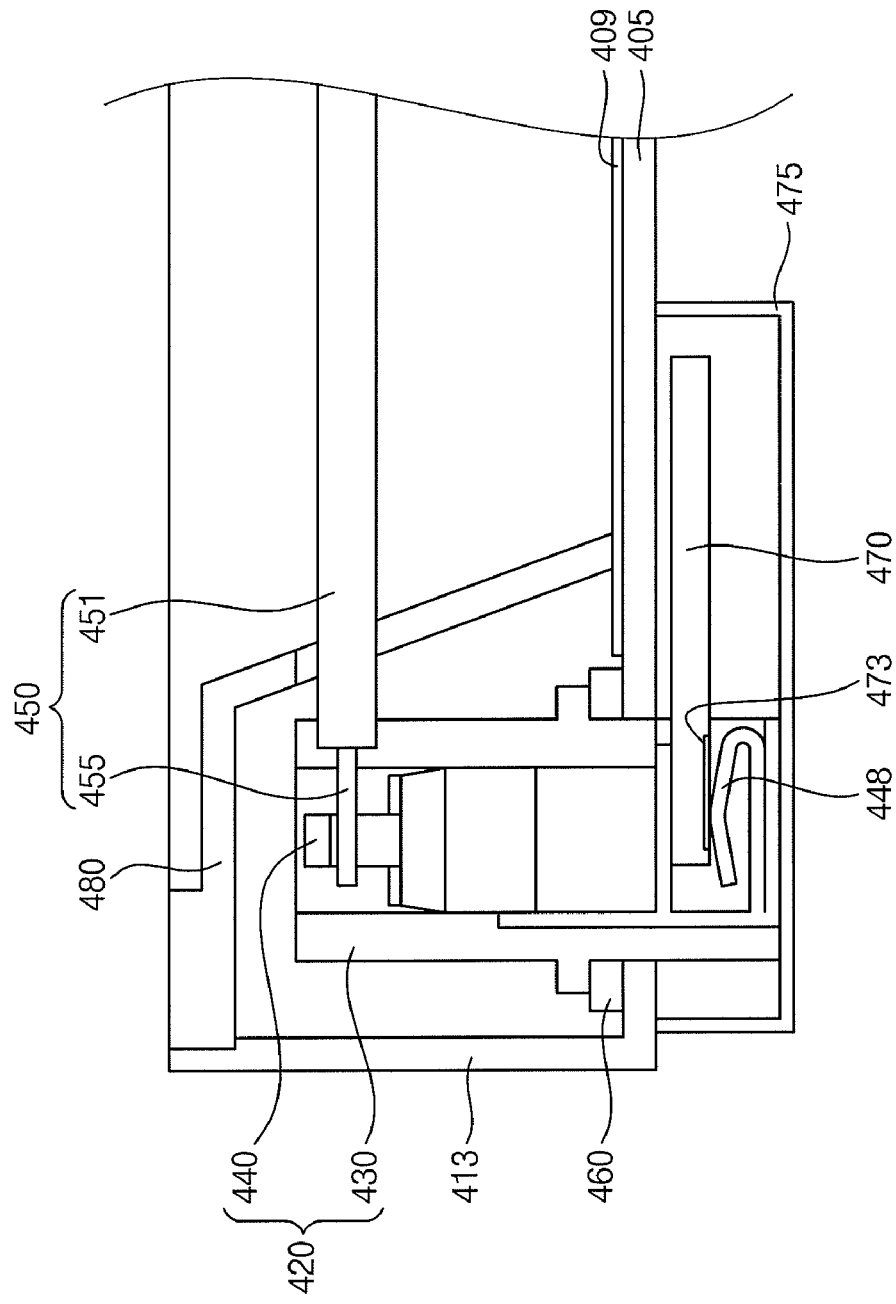
FIG. 9 is a cross-sectional view taken along a line III-III' shown in FIG. 8.

FIG. 8 is an exploded perspective view illustrating a backlight assembly in accordance with one embodiment of the present invention. FIG. 9 is a cross-sectional view taken along a line III-III' shown in FIG. 8.

Referring to FIG. 8, the backlight assembly 400 includes a receiving container 410, a plurality of lamp sockets 420, a plurality of lamps 450 and a power supply substrate 470.

The receiving container 410 includes a bottom plate 405, a first sidewall 411, a second sidewall 413, a third sidewall 415 and a fourth sidewall 417. The first, second, third and fourth sidewalls 411, 413, 415 and 417 protrude from the sides of the bottom plate 405 to form a receiving space. The first and second sidewalls 411 and 413 face each other. The third and fourth sidewalls 415 and 417 face each other, and are connected between the first and second sidewalls 411 and 413. A stepped portion is formed on an upper portion of the first, second, third and fourth sidewalls 411, 413, 415 and 417. A plurality of openings 407 are formed on the bottom plate 405 adjacent to the first and second sidewalls 411 and 413.

Figure 10:
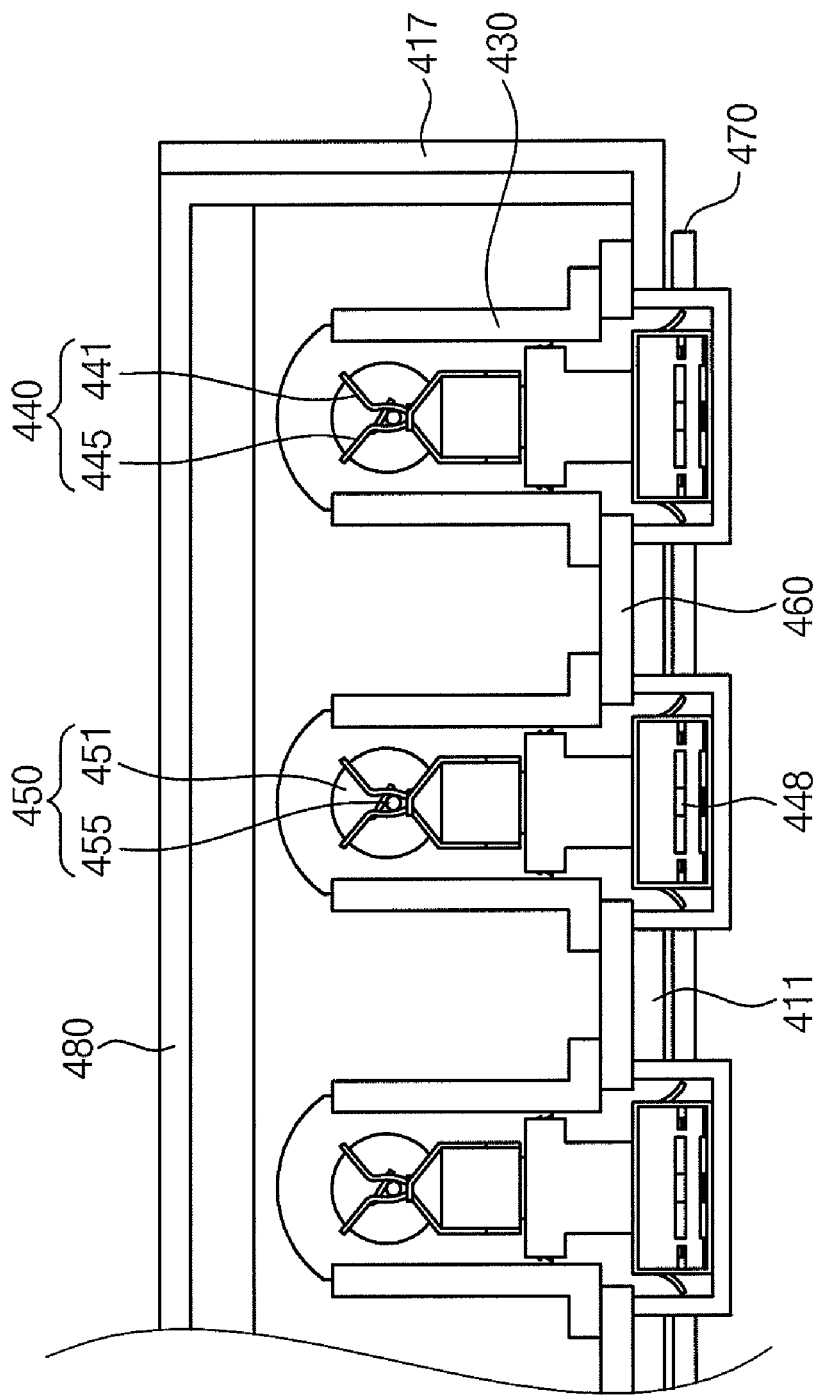
FIG. 10 is a cross-sectional view taken along a line IV-IV' shown in FIG. 8.

The lamp socket 420 of FIGS. 8 and 10 is substantially the same as in FIGS. 1 to 4.

The lamps 450 may be combined with the lamp sockets 420. Alternatively, the lamps 450 may be divided into a plurality of groups connected to the lamp sockets 420. The lamps 450 are aligned on the bottom plate 405 to generate light. For example, the lamps 450 may be aligned in a direction substantially parallel with the first and second sidewalls 411 and 413.

Each of the lamps 450 includes a lamp body 451 and an electrode portion 455. The lamp body 451 may have a cylindrical shape, and a discharge gas may be injected into the lamp body 451. The discharge gas may include argon and mercury. The electrode portion 455 is disposed on an end portion of the lamp body 451. The electrode portion 455 may include a discharge electrode and a lead wire. The discharge electrode may be disposed in the lamp body 451, and the lead wire may be extended from the discharge electrode toward the exterior to the lamp body 451. Alternatively, the lamp 450 may include an EEFL.

The backlight assembly 400 may further include a connecting plate 460. The connecting plate 460 is substantially the same as in FIGS. 5 to 7. Thus, any further explanation concerning the above element will be omitted. Each of the lamp sockets 420 is inserted into each of the openings formed through the connecting plate 460. The connecting plate 460 is adjacent to the first and second sidewalls 411 and 413. The lamp sockets 420 inserted into the openings of the connecting plate 460 are inserted into a plurality of openings 407 formed through the bottom plate 405. The inverter receiving hole is exposed toward a lower surface of the bottom plate 405, and the connecting hole is exposed toward an upper surface of the bottom plate 405.

The backlight assembly 400 may further include a reflecting plate 409. The reflecting plate 409 is disposed on the bottom plate 405 of the receiving container 410 to reflect the light generated from the lamps 450 toward an upper portion of the backlight assembly 400.

The power supply substrate 470 is disposed on the lower surface of the bottom plate 405 to generate a lamp driving voltage. The power supply substrate 470 may include a printed circuit board (PCB) and a power supply element mounted on the PCB.

A side of the power supply substrate 470 is inserted into the inverter receiving holes of the lamp sockets 420. The side of the power supply substrate 470 corresponding to the inverter receiving holes protrude toward the inverter receiving holes. Thus, the side of the power supply substrate 470 has alternating teeth protrusions when viewed on a plane.

Output terminals are formed on the protruded portions of the side of the power supply substrate 470. The output terminals may be formed by partially exposing conductive lines that are formed on the PCB.

The backlight assembly 400 may further include a protecting case 475 that protects the power supply substrate 470 and blocks electromagnetic interference.

The backlight assembly 400 may further include a plurality of side covers 480.

The side covers 480 are disposed on the first and second sidewalls 411 and 413 to cover the lamp sockets 420 adjacent to the first and second sidewalls 411 and 413 and to protect the lamp sockets 420.

FIG. 9 is a cross-sectional view taken along a line II-II' shown in FIG. 8.

FIG. 10 is a cross-sectional view taken along a line IV-IV' shown in FIG. 8.

Figure 11:
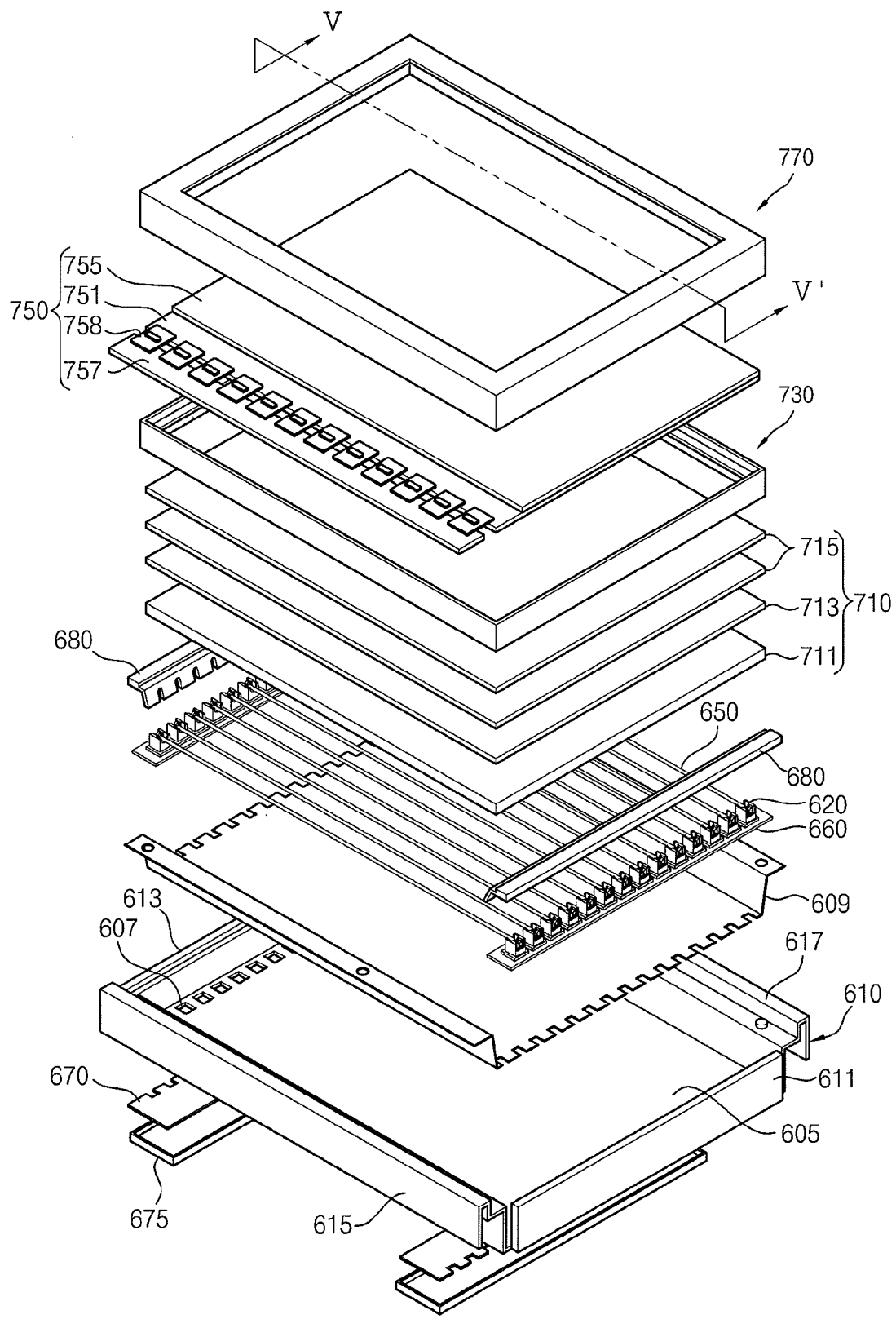
FIG. 11 is an exploded perspective view illustrating one embodiment of the present invention.
Figure 12:
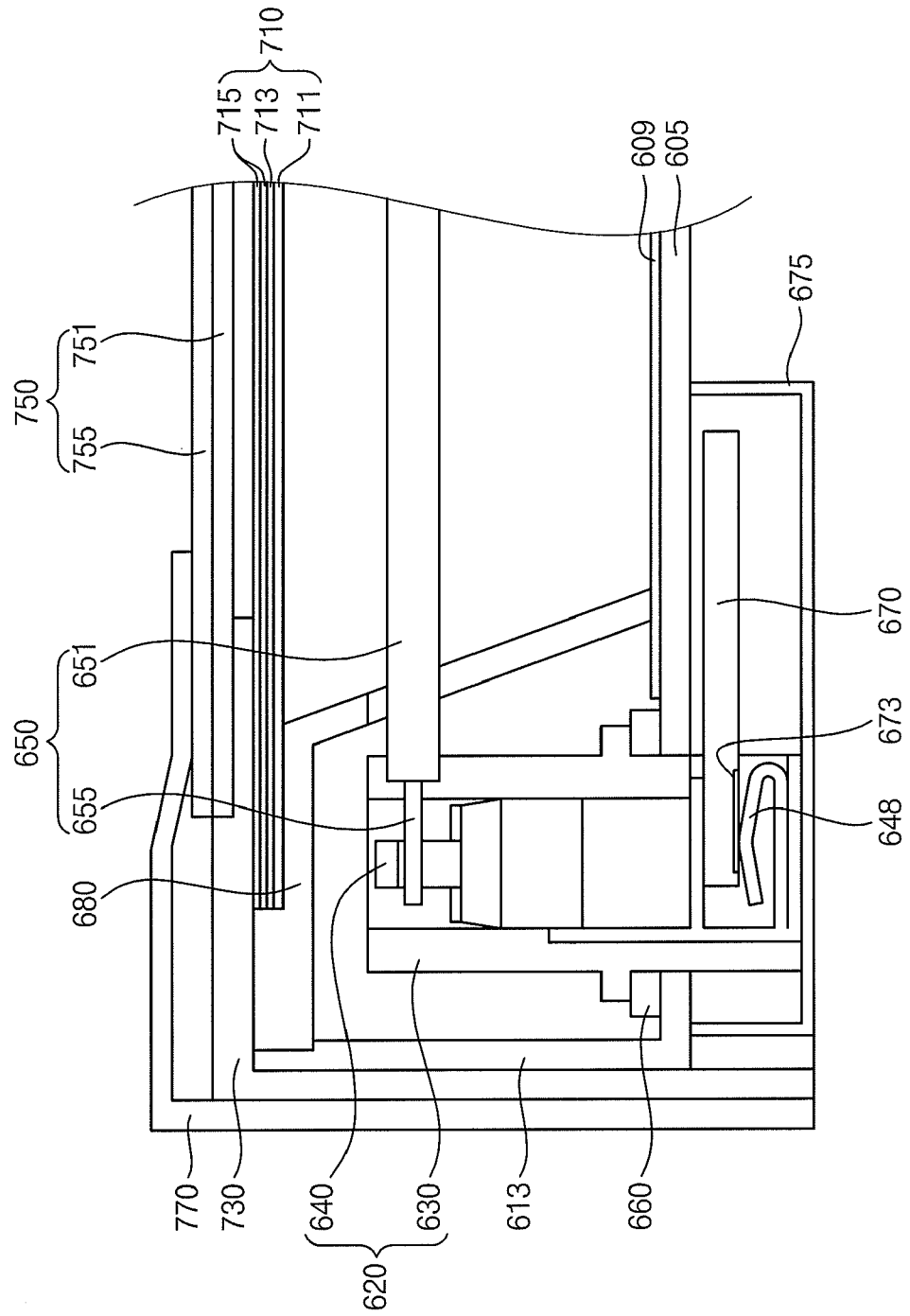
FIG. 12 is a cross-sectional view taken along a line V-V' shown in FIG. 11.

Referring to FIGS. 11 and 12, the display device 600 includes a receiving container 610, a plurality of lamp sockets 620, a plurality of lamps 650, a connecting plate 660, a power supply substrate 670, a side cover 680, optical sheets 710 and a display panel 750.

The receiving container 610, the lamp sockets 620, the connecting plate 660, the lamps 650, the power supply substrate 670 and the side cover 680 of FIGS. 13 and 14 are substantially the same as in FIGS. 11 and 12. Thus, the same reference numerals will be used to refer to the same or like parts as those described in FIGS. 10 and 11 and any further explanation concerning the above elements will be omitted.

The optical sheets 710 may improve optical characteristics of the light generated from the lamps 650. The optical sheets 710 include a diffusion plate 711, a diffusion sheet 713 and a prism sheet 715 that are stacked in sequence. The diffusion plate 711, the diffusion sheet 713 and the prism sheet 715 are supported by the stepped portions formed on the third sidewall 615, the fourth sidewall 617 and the side cover 680.

The diffusion plate 711 diffuses the light generated from the lamps 650 to increase luminance uniformity of the light. The diffusion sheet 713 also diffuses the diffused light having passed through the diffusion plate 711. The prism sheet 715 guides the diffused light toward a front direction of the backlight assembly, thereby improving luminance when viewed on a plane.

The display device 600 may further include a middle frame cover 730. The middle frame cover 730 covers a peripheral portion of the optical sheets 710, and is combined with the receiving container 610.

The display panel 750 displays an image based on light having passed through the optical sheets 710. The display panel 750 includes a first substrate 751, a second substrate 755 and a liquid crystal layer (not shown). The second substrate 755 faces the first substrate 751. The liquid crystal layer is interposed between the first and second substrates 751 and 755.

The display device 600 may further include a panel PCB 757 and a connecting film 758. The panel PCB 757 applies panel driving signals to the display panel 750. The connecting film 758 is electrically connected between the first substrate 751 and the panel PCB 757.

The display device 600 may further include a top chassis 770 combined with the receiving container 610 or the middle frame 730, and has an opening through which an effective display region of the display panel 750 is exposed.

According to the present invention, a lamp socket only includes two elements such as a socket housing and a power supply member, and a socket cover may be omitted. Thus, the number of elements of the lamp socket, a power supply module, a backlight assembly and a display device may be decreased. In addition, first and second lamp connecting terminals of the power supply member may not be pressed by the lamp socket, and the shape of the first and second lamp connecting terminals may be adjusted so that the lamps may be loaded through an automated assembly process. Therefore, a defect caused by pressing a socket cover during the automated assembly process may be prevented.

This invention has been described with reference to the example embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A lamp socket that secures a connecting terminal of a lamp, the lamp socket comprising:
   a socket housing; and
   a power supply member that combines with the socket housing, the power supply member comprising:
   a first lamp connecting terminal comprising a securing member; and
   a second lamp connecting terminal spaced from the first lamp connecting terminal to receive the connecting terminal of the lamp between the first lamp connecting terminal and the second lamp connecting terminal, the second lamp connecting terminal comprising a securing member opening that receives the securing member, wherein the securing member protrudes toward the opening from the first lamp connecting terminal downwardly so that the securing member prevents the connecting terminal of the lamp from upwardly moving.

2. The lamp socket of claim 1, wherein a connecting hole inserted by the power supply member is formed through the socket housing.

3. The lamp socket of claim 2, wherein an inverter receiving hole connected to the connecting hole is formed through the socket housing.

4. The lamp socket of claim 3, wherein a lamp guide groove for receiving the lamp through the socket housing.

5. The lamp socket of claim 4, wherein the power supply member further includes an inverter connecting terminal that is integrally formed with the first and second lamp connecting terminals, and is exposed through the inverter receiving hole.

6. The lamp socket of claim 5, wherein the power supply member further comprises a connecting part connecting the inverter connecting terminal with the first and second lamp connecting terminals.

7. The lamp socket of claim 6, wherein both the first lamp connecting terminal and the second lamp connecting terminal further including a first fixing portion pressing on an electrode portion of a lamp and a first guide portion that is extended from an end portion of the first fixing portion and bent toward the connecting hole.

8. A backlight assembly comprising:
   a receiving container including a bottom plate having a sidewall protruded from a side of the bottom plate;
   a plurality of lamps on the bottom plate, each of the lamps including a lamp body and an electrode portion on an end portion of the lamp body; and
   a lamp socket that secures a connecting terminal of a lamp, the lamp socket comprising a socket housing and a power supply member including a first lamp connecting terminal comprising a securing member and a second lamp connecting terminal spaced from the first lamp connecting terminal to receive the connecting terminal of the lamp between the first lamp connecting terminal and the second lamp connecting terminal, the second lamp connecting terminal comprising a securing member opening that receives the securing member, wherein the securing member protrudes toward the opening from the first lamp connecting terminal downwardly so that the securing member prevents the connecting terminal of the lamp from upwardly moving.

9. The backlight assembly of claim 8, wherein a connecting hole inserted by the power supply member is formed through the socket housing.

10. The backlight assembly of claim 9, wherein an inverter receiving hole connected to the connecting hole is formed through the socket housing.

11. The backlight assembly of claim 10, wherein a lamp guide groove for receiving the lamp through the socket housing.

12. The backlight assembly of claim 11, wherein the power supply member further includes an inverter connecting terminal that is integrally formed with the first and second lamp connecting terminals, and is exposed through the inverter receiving hole.

13. The backlight assembly of claim 12, wherein the power supply member further comprises a connecting part connecting the inverter connecting terminal with the first and second lamp connecting terminals.

14. The backlight assembly of claim 13, wherein both the first lamp connecting terminal and the second lamp connecting terminal further including a first fixing portion pressing on the electrode portion of the lamp and a first guide portion that is extended from an end portion of the first fixing portion and bent toward the connecting hole.

15. A display device comprising:
   a receiving container including a bottom plate having a sidewall protruded from a side of the bottom plate;
   a plurality of lamps on the bottom plate, each of the lamps including a lamp body and an electrode portion on an end portion of the lamp body;
   a lamp socket that secures a connecting terminal of a lamp, the lamp socket comprising a socket housing and a power supply member including a first lamp connecting terminal comprising a securing member and a second lamp connecting terminal spaced from the first lamp connecting terminal to receive the connecting terminal of the lamp between the first lamp connecting terminal and the second lamp connecting terminal, the second lamp connecting terminal comprising a securing member opening that receives the securing member, wherein the securing member protrudes toward the opening from the first lamp connecting terminal downwardly so that the securing member prevents the connecting terminal of the lamp from upwardly moving;
   a power supply substrate on the bottom plate to generate a lamp driving voltage to the power supply member;
   a side cover that covers the socket housings;
   optical sheets supported by the side cover; and
   a display panel disposed on the optical sheets.

16. The lamp socket of claim 15, wherein a connecting hole inserted by the power supply member is formed through the socket housing and an inverter receiving hole connected to the connecting hole is formed through the socket housing.

17. The lamp socket of claim 16, wherein a lamp guide groove for receiving the lamp through the socket housing and the power supply member further includes an inverter connecting terminal that is integrally formed with the first and second lamp connecting terminals, and is exposed through the inverter receiving hole.

18. The lamp socket of claim 17, wherein the power supply member further comprises a connecting part connecting the inverter connecting terminal with the first and second lamp connecting terminals and both the first lamp connecting terminal and the second lamp connecting terminal further including a first fixing portion pressing on an electrode portion of a lamp and a first guide portion that is extended from an end portion of the first fixing portion and bent toward the connecting hole.

19. A lamp socket that secures a terminal of a lamp, the lamp socket comprising:
   a socket housing; and
   a power supply member that combines with the socket housing, the power supply member comprising:
      a first lamp connecting terminal comprising a securing member means for securing a terminal of the lamp; and
      a second lamp connecting terminal spaced from the first lamp connecting terminal to receive the terminal of the lamp between the first lamp connecting terminal and the second lamp connecting terminal, the second lamp connecting terminal comprising a securing member opening means for receiving the securing member means and securing the terminal of the lamp for accidentally being disconnected from the first and second lamp connecting terminals wherein the securing member means downwardly so that he securing member means prevents the terminal of the lamp from upwardly moving.

20. A method of securing a terminal of a lamp, the method comprising:
   forming a first lamp connecting terminal comprising a securing member; and
   forming a second lamp connecting terminal spaced from the first lamp connecting terminal to receive the terminal of the lamp between the first lamp connecting terminal and the second lamp connecting terminal, the second lamp connecting terminal comprising a securing member opening that receives the securing member, wherein the securing member protrudes toward the opening from the first lamp connecting terminal downward so that the securing member prevents the terminal of the lamp from upwardly moving.

* * * * *